United States Patent
Geffroy

[15] 3,656,766
[45] Apr. 18, 1972

[54] PISTON AND PISTON RINGS UNIT FOR AN INTERNAL COMBUSTION ENGINE

[72] Inventor: Robert Geffroy, 1, boulevard Richard Wallace, Neuilly-sur-Seine, France

[22] Filed: Dec. 15, 1969

[21] Appl. No.: 885,245

[52] U.S. Cl. .................................................. 277/136
[51] Int. Cl. ................................................ F16j 9/12
[58] Field of Search ............... 277/136, 138, 142, 170, 143, 277/165, 139

[56] References Cited

UNITED STATES PATENTS 2,852,324  9/1958  Marien ................................. 277/138

FOREIGN PATENTS OR APPLICATIONS 544,848  4/1942  Great Britain

Primary Examiner—Robert I. Smith
Attorney—Bacon & Thomas

[57] ABSTRACT

The invention has for its object, on the one hand, all means which protect, at least partially, the internal face of the sealing joint placed between the lower adjacent faces of the piston ring and the piston groove against the high pressures which, from the combustion chamber pass between the compression ring and the bottom of the groove and also into the cross-sectional or gap clearance of the compression ring, and on the other hand, a support for the said joint, which is not affected by creep, is annular, is not fixed to the piston and is arranged at least under the periphery of the said joint between the joint and the lower face of the piston groove, the peripheral face of the support being maintained at least in proximity to the cylinder and having as a maximum narrow discontinuities, the maximum clearances of this proximity and of these discontinuities being smaller than those in which the material of the said joint begins to creep, under the conditions of temperatures and pressures reached during the operation of the engine.

34 Claims, 23 Drawing Figures

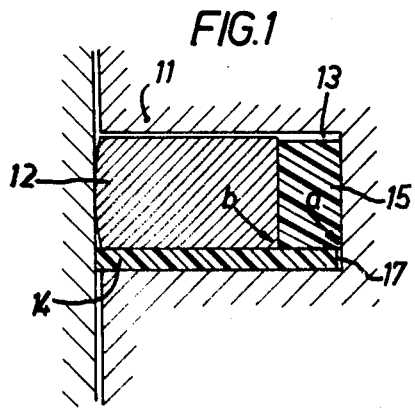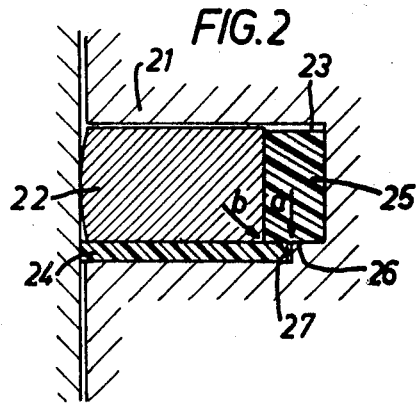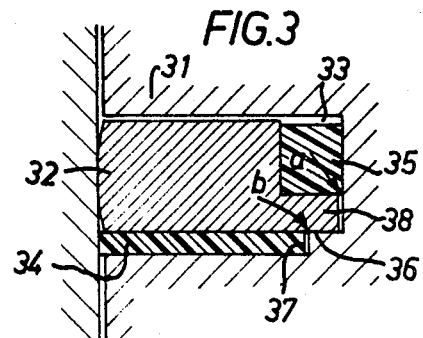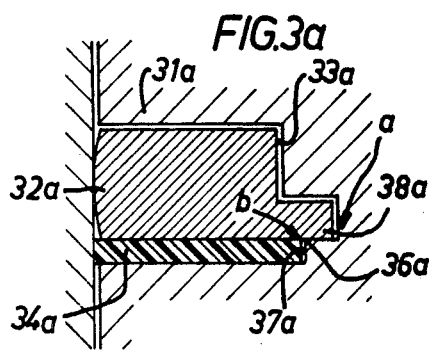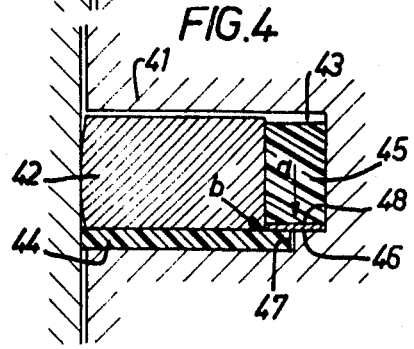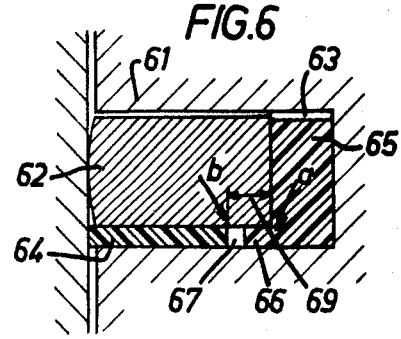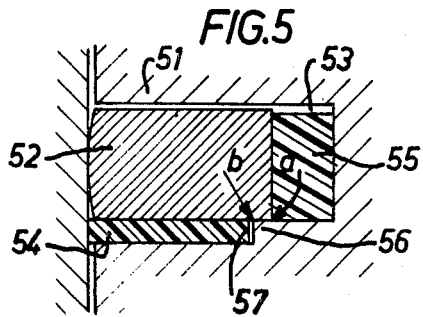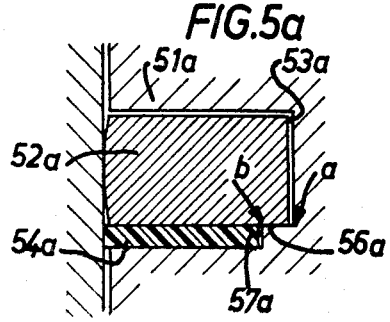

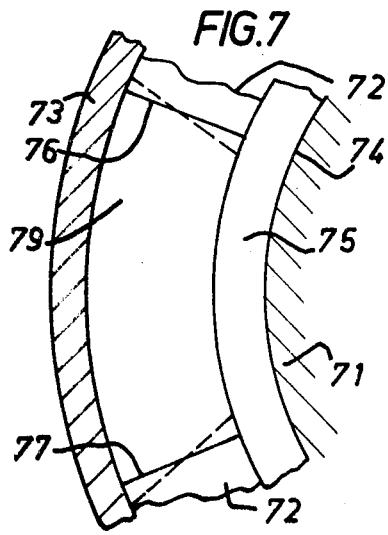
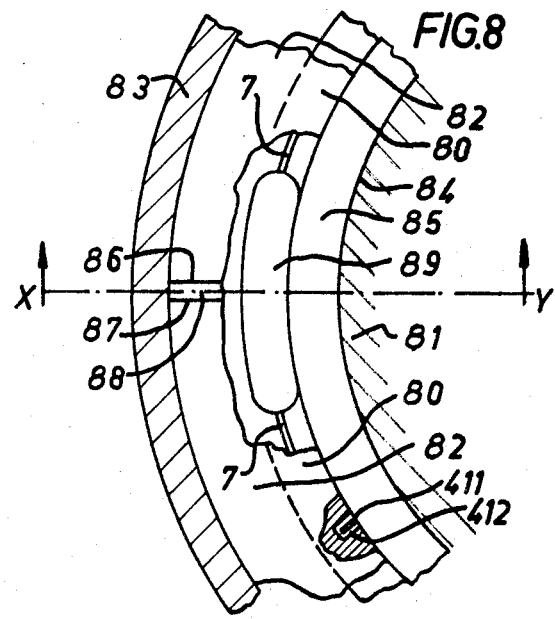
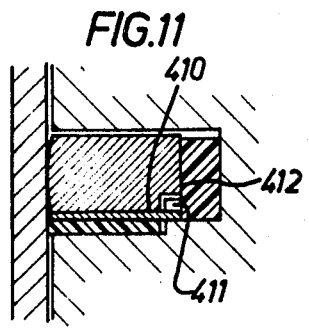
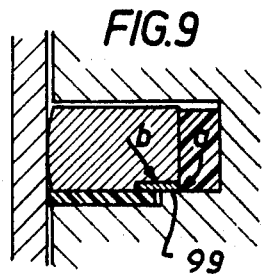
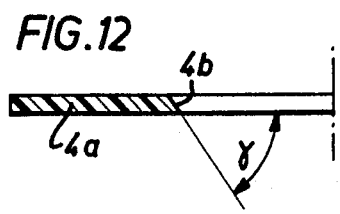
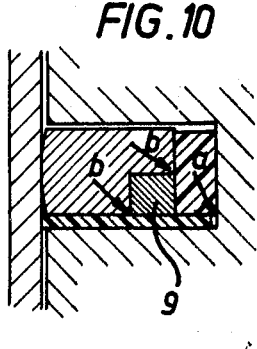

3,656,766

PISTON AND PISTON RINGS UNIT FOR AN INTERNAL COMBUSTION ENGINE

A known piston and piston rings assembly for internal combustion engines comprises especially at least one compression ring associated in its groove with a joint arranged between the lower adjacent faces of the ring and the groove and, when so desired, with a second joint arranged between the bottom of the groove and the ring.

Now, it has become apparent during the course of tests on assemblies of this kind, that the high pressures existing in the combustion chamber which pass, on the one hand into the groove behind the compression ring, directly if there is no joint at the bottom of the groove or through the said joint if there is one, and on the other hand into the cross-sectional clearance of the compression ring acting on the internal faces of the joint which is placed between the lower adjacent faces of the ring and the groove.

This results in a substantial thrust of the said joint against the cylinder. It has been found by experience that on engines having high peaks of combustion pressure, Diesel engines for example, this pressure may cause premature deterioration of this joint by excessive wear, creep or extrusion between the piston and the cylinder.

The present invention overcomes this disadvantage. It has for its object, on the one hand, all means which protect, at least partially, the internal face of the sealing joint placed between the lower adjacent faces of the piston ring and the piston groove against the high pressures which, from the combustion chamber pass between the compression ring and the bottom of the groove and also into the cross-sectional or gap clearance of the compression ring, and on the other hand, a support for the said joint, which is not affected by creep, is annular, is not fixed to the piston and is arranged at least under the periphery of the said joint between the joint and the lower face of the piston groove, the peripheral face of the support being maintained at least in proximity to the cylinder and having as a maximum narrow discontinuities, the maximum clearances of this proximity and of these discontinuities being smaller than those in which the material of the said joint begins to creep, under the conditions of temperatures and pressures reached during the operation of the engine.

Other characteristic features and advantages of the present invention will be more clearly brought out in the description which follows below, reference being made to the accompanying drawings, in which:

FIGS. 1 to 6 represent various means embodying the invention for protecting the internal face of the sealing joint placed between the lower adjacent faces of the piston ring and the piston groove, against the high pressures which pass into the bottom of the groove;

FIGS. 7 to 11 show various means embodying the invention for protecting the internal face of the above-mentioned joint against the high pressures which pass into the cross-sectional or gap clearance of the compression ring;

FIG. 12 shows a lateral ring joint, in which the internal face is inclined;

Figure 19:
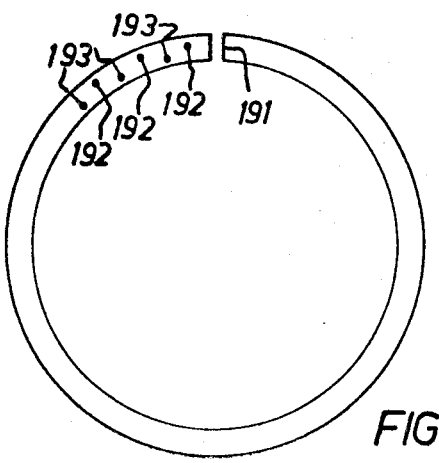
Figure 20:
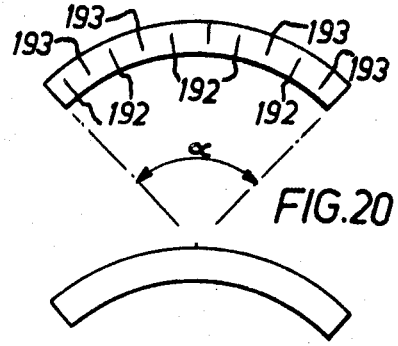
Figure 21:

FIGS. 13 to 18 each show an example of the support forming the object of the invention, applied to a piston and compression ring assembly comprising a sealing joint between the lower adjacent faces of the ring and the groove;

FIGS. 19 to 21 each represent one means of production of these supports.

FIG. 1 shows in a piston 11, a compression ring 12, a ring groove 13, a sealing joint 14 and a joint 15 at the bottom of the groove. The joint 14 is extended towards the axis of the piston at least up to the vicinity of the bottom of the groove, and its contact 17 with the groove bottom is a tight or free contact or is a clearance.

FIG. 2 represents in a piston 21, a compression ring 22, a ring groove 23, a sealing joint 24 arranged between the lower adjacent faces of the ring and the groove and a joint 25 for the bottom of the groove. The joint 24 passes beyond the ring 22 towards the bottom of the groove up to a step 26 having a thickness similar to that of the joint 24, which extends the lower face of the groove up to the bottom of the groove. The internal diameter of the joint 24 is at most slightly greater than the diameter of the step 26 and its contact 27 with the step is a tight or free contact or a clearance.

FIG. 3 shows an assembly similar to that of FIG. 2, in which there is again seen the piston 31, the ring 32, the groove 33, the lateral joint 34, the groove bottom joint 35, the groove bottom step 36, the line of contact or clearance 37 and an extension 38 of the lower portion of the ring 32 up to a small clearance between the extremity of this extension and the bottom of the groove. The thickness of this extension 38 is variable, for example between 20 and 70 percent of the thickness of the ring.

FIG. 3a represents an alternative form of the construction of FIG. 3, which does not comprise any groove bottom joint, in which the groove 33a follows, with the customary working clearances, the shape of the lower portion of the ring 32a.

FIG. 4 shows a construction similar to that of FIG. 3, in which there is again seen the piston 41, the ring 42, the groove 43, the lateral ring joint 44, the groove bottom joint 45, the groove bottom step 46, the line of contact or clearance 47, and a thin ring 48 arranged between the line of contact or the clearance 47 and the groove bottom joint 45.

FIG. 5 shows, in a piston 51, a compression ring 52, a ring groove 53, a lateral ring groove 54, a groove bottom join 55 and a groove bottom step 56. The height of the step 56 is such that, during maximum peaks of pressure, the ring 52 comes into contact with the step 56 by the effect of the crushing of the joint 54. The external diameter of the groove bottom step is greater than the internal diameter of the ring 52, so that it presents an abutment to the central portion of the lower face of the ring 52. The internal diameter of the joint 54 is at most slightly greater than that of the step 56 and their contact 57 is a tight or free contact or is a clearance.

FIG. 5a shows an assembly identically the same as that of FIG. 5, which is not provided with any groove bottom joint. The bottom of the groove 53a is then as close to the internal face of the ring as is permitted by the clearances necessary for the manufacture and the operation, and the joint of the gap of the compression ring is preferably of the fluid tight type which will be described later with reference to FIG. 7.

FIG. 6 represents, in a piston 61, a compression ring 62, a ring groove 63, a lateral joint 64 and a groove bottom joint 65. The internal diameter of the joint 64 is greater than the internal diameter of the ring 62 by an amount 69, the function of which will become apparent during the course of the explanation of the operation.

FIG. 7 shows a partial view of a piston 71 in section, a compression ring 72 in a section of a cylinder 73 and of a groove bottom joint 75 arranged between the ring 72 and the bottom of the groove 74. The ring 72 and the joint 75 represent indistinctly the ring the the joint 12 and 15 of FIG. 1, 22 and 25 of FIG. 2, 32 and 35 of FIG. 3, 42 and 45 of FIG. 4, 52 and 55 of FIG. 5, 62 and 65 of FIG. 6.

The extremities 76 and 77 of the ring 72 have a high clearance, for example of 10 mm. and in this sectional clearance is arranged an arcuate segment 79, the geometry of which is similar to that of the ring 72. This arcuate segment 79 is assembled in contact, without clearance when cold or with a forced fit when cold, between the extremities 76 and 77 of the ring 72. Explanations will be given later with regard to the material and the length of the arcuate segment 79. The gap extremities 76 and 77 may be radial as indicated in full lines or they may be inclined, as shown in broken lines.

FIG. 8 represents a partial view of a cut piston 81, a compression ring 82 in a cut cylinder 83 and a groove bottom joint 85 arranged between the ring 82 and the bottom of the groove 84. The ring 82 and the joint 85 represent indistinctly the ring and the joint 12 and 15 of FIG. 1, 22 and 25 of FIG. 2, 32 and 35 of FIG. 3, 42 and 45 of FIG. 4, 52 and 55 of FIG. 5, 62 and 65 of FIG. 6. The extremities 86 and 87 of the compression ring 82 form between them a clearance 88 corresponding to the requirements of thermal expansion of the ring 82.

Between this clearance 88 and the internal face of the lateral ring joint, either 17 or 27 or 47 or 57 or 67 of FIGS. 1 to 6, is interposed a joint embedded in the lower face of the ring. According to one form of construction, this joint 89 only comprises a small arc of a washer covering the gap in the ring 82. According to another form of construction, this joint 80 is circular. The ring 82 is broken away in order to show the joint 89 which is embedded in its lower face and the line of contact or clearance 7 between the lateral ring joint and the step in the groove. A second small broken away portion shows the stopping device 411, 412, between the ring 82 and an annular gap joint 80.

FIG. 9 represents a view in section taken along the line XY of FIG. 8, in which the parts, ring, joints and groove are those of FIG. 5. The joint 89 of FIG. 8 may in this case be of small thickness; it is shown at 99 in FIG. 9.

FIG. 10 shows a view in cross-section XY of FIG. 8, taken with the parts of FIGS. 1, 2, 3, 3a, 4 and 6. The joint 89 of FIG. 8 has a greater thickness than in the case of FIG. 9; this is shown at 9 in FIG. 10.

FIG. 11 shows another construction of the sealing joint for the compression ring gap, applicable to FIG. 5. This is a circular joint 410 having a radial width of the same order as that of the compression ring with which it is associated.

FIG. 12 shows a lateral ring joint 4a applicable to the examples of FIGS. 1 and 2, the internal face 4b of which is inclined so as to form a truncated cone open towards the piston head with an angle α which can vary for example from 85° to 25°.

These various gap joints 79 of FIG. 7, 89 and 80 of FIG. 8, 99 of FIG. 9, 9 of FIG. 10, 410 of FIG. 11, are preferably made of any sealing materials capable of withstanding the conditions of temperature and attack of the various fuel products, oil, gas and combustion residues which occur in an engine. "Teflon" in a mixture with products which increase its mechanical characteristics is a good example of material suitable for these purposes. Those joints which are circular (the case of the joints 80 and 410) may also be of metal such as for example an alloy of copper, cast-iron or steel. The circular joint, if it is of a material having a sufficient possibility of deformation in the cold or hot state, to be placed in position in the groove by extension, may be continuous that is to say without a gap, and if it is of metal, it must of necessity be cut.

When the circular joint is provided with a gap, it is preferably provided with means for preventing it from rotating with respect to the compression ring, so as to prevent their gaps from being superimposed. This means may be of any known type, for example a small bent tongue of the joint 411 engaged in a cavity 412 of the ring, FIG. 11.

Figure 13:
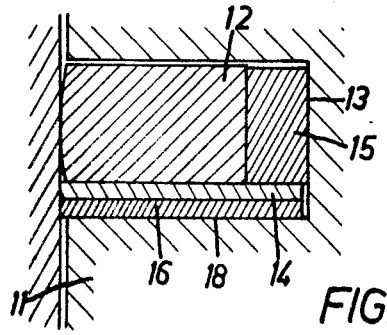

FIG. 13 represents, in a cylinder, a piston 11, a compression ring 12, a ring groove 13, a joint 14 between the lower adjacent faces of the ring and the groove, and a groove bottom joint 15.

The support forming the object of the invention is a ring 16 having a radial width similar to that of the joint 14, arranged between the joint 14 and the lower face of the groove 18 of the piston 11.

Figure 14:
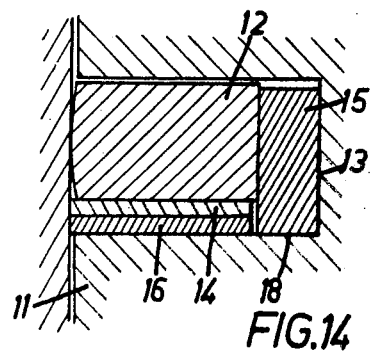

FIG. 14 shows an assembly similar to that of FIG. 13, but in which the groove bottom joint 15 extends up to contact with the lower groove face 18, so that the joint 14 and the metal support 16 are at least very close, if not in contact by their internal surfaces, with the joint 15.

Figure 15:
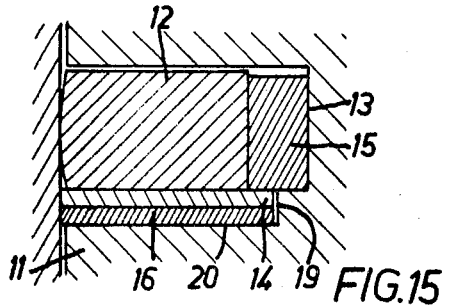

FIG. 15 represents an assembly similar to that of FIG. 13, in which the internal diameters of the joint 14 and the support 16 are of the same order and are both larger than the diameter of the bottom 13 of the groove and smaller than the internal diameter of the ring 12, the lower face of the groove comprising a shoulder 19 which de-limits a recess 20 capable of receiving the joint 14 and the support 16.

Figure 16:
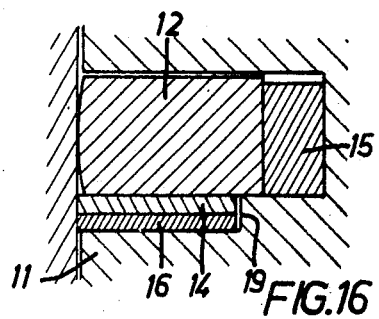

FIG. 16 shows an assembly similar to that of FIG. 15, but in which the internal diameter of the ring 12 is smaller than the diameter of the shoulder 19 of the piston groove and than the internal diameters of the joint 14 and the support 16.

Figure 17:
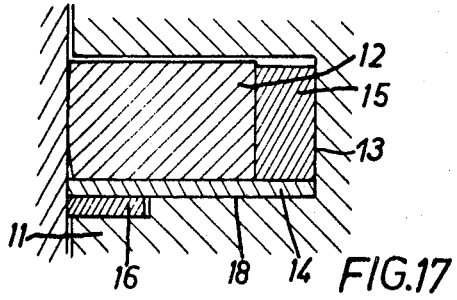

FIG. 17 represents an assembly similar to that of FIG. 13, in which the support 16 has an internal diameter very definitely smaller than those of the ring 12 and the joints 14, so that the joint 14 is applied simultaneously against the part of the lower face 18 of the groove and against the support 16.

Figure 18:
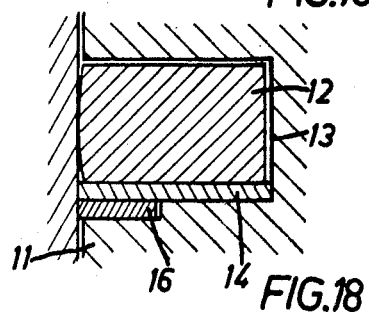

FIG. 18 shows an assembly similar to that of FIG. 17, but having no groove bottom joint.

FIG. 19 shows an example of construction of the support 16 in one piece. It is constituted by a ring, preferably cut at 191 so as to facilitate placing it in position. This ring has radial cuts on one portion only of its radial width. These cuts 192, 193, 192, 193, are arranged alternately. In the free state, the ring has a diameter slightly greater than that of the cylinder and the cuts are slightly open. Thus, its placing in position in the cylinder is effected by compression of its periphery. This results in a reduction of the widths of the cuts 192 and 193 and an elastic reaction of the ring against the cylinder.

The clearances of the cuts 193 are preferably adjusted to the vicinity of the minimum necessary for ensuring the thermal expansion of the support without blocking it in the cylinder. For example, for a cylinder of the order of 150 mm., a support such as shown in FIG. 19 which comprises 20 cuts 193 and 20 cuts 192, each having an average clearance of 0.035 mm., thus has a total clearance of the order of 0.700 mm.

FIG. 20 represents a segment of a support identical with that of FIG. 19, the angle α of which is adjusted so that the association of a whole number of segments, for example from three to six, forms a complete support.

Finally, FIG. 21 shows a segment of a support similar to that of FIG. 20, but having no elasticity cuts. This kind of support has no inherent elasticity, but the distribution of the gap clearance between the number of segments employed would reduce the clearance of each gap to small values.

The material of these various supports is a material having good resistance to temperature, to creep, to oil, to fuels and to combustion gases. This is the case of the majority of metals. When this support is held applied against the cylinder by its elasticity (the case of the supports of FIGS. 19 and 20), it should also possess a certain elasticity and good characteristics of friction against the cylinder. Cast-iron and heat-treated steels are good examples of these materials. The material of the support may also have high heat conductivity: copper, silver and their alloys are good examples of these materials.

The operation of these joints is as follows: in FIGS. 1, 2, 3 and 4, the groove bottom joint 15, or 25 or 35 or 45 is interposed between the pressure of the combustion chamber which passes into the bottom of the groove towards the top of the groove bottom joint and the internal faces 17, or 27, or 37 or 47 of the lateral ring joint. This interposition prevents the transmission through the bottom of the groove of the pressure of the combustion chamber on the internal face of the lateral ring joint.

However, in the case of FIGS. 1 and 2, as and when the clearance 17 or 27 forms and develops by the wear of the joint 14 or 24 on the cylinder, the joint 15 or 25 can creep into this clearance and this transmits, with the reduction of a large loss of pressure due to its viscosity, the pressures of the groove bottom to the internal face of the lateral ring joint. The slope 4b, FIG. 12, of the internal face of the lateral joint 14 or 24 is another means for transmitting to the lateral ring joint a part of the pressure of the combustion chamber received by the joint 15 or 25.

Thus, this partial transmission of the groove bottom pressure to the internal face of the lateral ring joint is one of the parameters which contribute to the application of the lateral ring joint against the cylinder, and the clearance 17 or 27, the viscosity of the joint 15 or 25, and the slope 4b represent as many regulating factors for this parameter.

In the case of FIGS. 3 and 4 on the other hand, the internal face 37 or 47 of the lateral ring joint 34 or 44 is protected against any creep of the groove bottom joint by the extension 38 of the ring or the washer 48 and thus the joint 34 or 44 is freed from any application force against the cylinder due to the high pressures of the combustion chamber, via the bottom of the groove.

With the assembly shown in FIG. 3a, the protection of the clearance 37a against the pressures of the combustion chamber through the groove bottom and the joint of the gap is ensured by the fluid-tight gap joint of the same type as the joint 79 of FIG. 7, and by the shoulder of the ring 38a which covers the said clearance. It may however be feared that in the absence of the groove bottom joint, the fluid-tightness of the ring shoulder 38a on the shoulder 36a of the piston groove may not be sufficient to prevent the high pressures at the groove bottom from passing through the clearance 37a.

In the case of FIG. 5, it is the contact of the ring 52 against the shoulder 56 of the piston which provides a screen to the passage of the pressure and to the creep of the joint 55. This device completely protects the internal face 57 of the lateral ring joint 54 against the high pressures of the combustion chamber through the groove bottom.

The assembly show in FIG. 5a operates in the same way as that of FIG. 3a, with the same reservation as to the possible inadequacy of the fluid-tightness between the ring 52a and the groove shoulder 56a, which exposes the clearance 57a to incomplete protection against the high pressures of the groove bottom.

In the case of FIG. 6, the viscosity of the joint 65 and the recess 67 of the joint 64 determine the loss of pressure suffered by the pressures of the groove bottom, before reaching the internal face of the joint 64, by means of a circular tongue 66 of the joint 65, the extrusion of which under the ring 62 is caused by the pressure.

To sum-up, the description and the explanation of operation of FIGS. 1 to 6 have shown:

a. Means for completely protecting the internal face of the lateral ring joint against the access of the pressure of the combustion chamber through the bottom of the groove, arrows a. They are shown in FIG. 1 without the clearance 17, FIG. 2 without the clearance 27, FIGS. 3, 4, 5 and 6 with a large clearance 67;

b. Means for permitting the regulation of the pressure produced on the internal face of the lateral ring joint in the direction of the cylinder by the high pressures of the combustion chamber transmitted through the bottom of the groove, arrows a. They are represented in FIGS. 1, 2 and 6 by the viscosity of the joints 15, 25 and 65, combined with the clearances 17, 27 and 67, and by the slope 4b of FIG. 12, applied to the joints 14 and 24 of FIGS. 1 and 2;

c. Means for applying to the lateral ring joint a thrust in the direction of the cylinder, continuous and independent of the pressure, by a prior clamping effect obtained on assembly against its internal face. This prior clamping effect can be effected in FIG. 1 between the joint 14 and the groove bottom; in FIG. 2, between the joint 24 and the shoulder 26; in FIG. 3 between the joint 34 and the shoulder 36; in FIG. 4 between the joint 44 and the shoulder 46; and in FIG. 5 between the joint 54 and the shoulder 56.

All the above means b and c are as many adjustable parameters which permit the adaptation to each type of engine of the application of the lateral ring joint against the cylinder so as to obtain the best compromise between the resistance to wear of the said joint and the highest reduction of the passage of gas.

Incidentally, FIG. 3 further comprises a regulating parameter of the application pressure of the ring against the cylinder by the effect of the high pressures of the combustion chamber which pass into the bottom of the groove. In fact, the high pressures passing into the bottom of the groove are stopped above the upper shoulder 38 of the ring by the joint 35 and through the clearance of the gap by the joint 9; thus, the portion of the internal face of the ring exposed to the effect of the high pressures, which apply it against the cylinder, can be reduced by more than 50% by increasing the thickness of the shoulder 38.

There will now be described the operation of the means described with reference to FIGS. 7 to 12 which eliminate access to the internal face of the lateral ring joint of the pressure coming from the combustion chamber through the gap in the ring, arrows b.

The ring 72 with the gap joint 79 of FIG. 7 prevents all possibility of the passage of gas through the gap in the compression ring due to the fact that, by construction, the gap joint 79 is in abutment and the heat expansions and contractions of the ring are absorbed by the elasticity of the gap joint, so that the continuity of the ring is ensured under all conditions.

The optional inclination of the ring extremities 76 and 77 shown in broken lines, converts to force of application of the joint 79 against the cylinder, the pressure applied on it by the ring extremities 76 and 77. This force may be necessary in order to ensure good fluid-tightness of this joint against the cylinder.

The gap joint 79 may furthermore contribute to the improvement of the maintenance in the hot state of the pressure of the ring on the cylinder. In fact, if it is mounted while cold with force between the extremities 76 and 77 of the ring, this clamping force increases in the hot state due to the effect of the expansion of the joint and of the ring, and this increase tends to prevent the loss of pressure of the ring on the cylinder which is a constant effect of temperature on the material of the ring, cast-iron or steel.

With this ring 72, FIG. 7, any penetration of the pressure of the combustion chamber through the compression ring gap in the direction of the arrows b of the various figures, is eliminated.

The joint of small thickness shown at 89 of FIG. 8 and at 99 of FIG. 9, is suitable when it can be supported by the ring simultaneously on the internal edge of the lateral joint and on the shoulder of the groove, as in the case of FIG. 5. It operates in the same manner if it is limited to a small segment 89 of FIG. 8 containing the gap of the compression ring, or if it is annular as at 80 in FIG. 8. It offers an obstacle to the transmission of pressure from the combustion chamber through the gap clearance at the internal face of the lateral ring joint.

The same thing is true of the joint 9 of FIG. 10, similar to the joint 99, but thicker. It may also be limited to a small segment or it may be circular.

This thick joint is suitable when it is not possible to force it by the ring simultaneously against the lateral joint and against the shoulder of the groove as in the case of FIGS. 1, 2, 3, 3a, 4 and 6. Its thickness then enables it to offer an obstacle to the passage of the pressure existing in the gap clearance of the ring simultaneously between its lower face and the lateral ring joint and between its internal face and the groove bottom joint. The thick joint of FIG. 10 has a square section, but its section could have any known form, for example a round section, a section with a lobe of the "quadring" type, square, which would be suitable to form a joint simultaneously on the square faces of the lateral ring joint and of the groove bottom joint.

Protection against the access of the high pressures existing at the bottom of the groove and in the gap clearance of the ring may be obtained by any combination of the means of which examples have been given above. Thus for example, the device of FIGS. 1 or 2 can protect the internal face 17 or 27 of the lateral joint 14 or 24 of the compression ring against the pressures existing at the bottom of the groove and against the pressures in the clearance of the ring gap, without the assistance of another joint when the contact between the joints 14 and 15 or between the joints 24 and 25 provides sufficient fluid-tightness.

On the other hand, for example, in the cases shown in FIG. 5 and FIG. 6, it is essential to adopt one of the constructions shown in FIGS. 7, 8, 9, 10 and 11, since it would serve no useful purpose to protect the internal faces 57 and 67 of the lateral ring joints against the pressures of the combustion chamber through the bottom of the groove, if these faces could receive the same pressure through the gap clearances.

The operation of the various supports shown in FIGS. 13 to 21 is as follows:

During the movements of the piston, the clearances 21 between the cylinder and piston vary, depending on whether the piston is in rubbing contact against the cylinder, on one or the other of its supporting surfaces. The support forming the subject of the present patent, on the contrary, maintains either a continuous contact with the cylinder due to the effect of its elasticity (the case of the supports shown in FIGS. 19 and 20), or a position very close to the cylinder, defined by a smaller clearance than that of the piston (the case of the supports of FIG. 21).

The continuity of this contact or the maintenance of a very small clearance between the support 16 and the cylinder, independently of the movements of the piston, protects the joint 14 against all risk of creep between the piston and the cylinder.

With regard to the risk of creep between the slots of the support, this is nil, since the gap clearance necessary for the thermal expansion of the support is distributed either between the elasticity slots or between the slots between each full segment, so that each of them is reduced to a small fraction of a total gap clearance of the support. Experience has shown that, under the temperature conditions of a piston of an internal combustion engine, a joint of "Teflon" with a filler of bronze powder, for example, does not creep through passages of the order of 0.10 to 0.20 mm. in width.

All the views shown in FIGS. 13 to 17 associate the support 16 with assemblies comprising a ring 12, a lateral joint 14 and a groove bottom joint 15. It is clear that the same arrangement could be applied to a construction such as that of FIG. 18, which would not comprise the groove bottom joint, and also to any other combination of these various devices which utilize a joint 14 between the adjacent faces of the ring and the groove.

The use of a support of a good conducting metal, bronze for example, especially if it is applied elastically against the cylinder, provides a favorable contribution to the thermal equilibrium of the piston by the evacuation of heat towards the cylinder.

I claim:

1. A piston and piston rings assembly for an internal combustion engine having at least one compression ring and corresponding compression ring groove in said piston, in a cylinder delimiting a combustion chamber with the head and said piston, a lateral ring joint having a lower modulus of elasticity than said compression ring disposed between the lower adjacent faces of said ring and corresponding groove, and characterized by combustion pressure resisting means to inhibit extrusion of said joint into the clearance existing between said piston and said cylinder.

2. An assembly as claimed in claim 1, wherein said last means comprises sealing means to reduce and control the subjection of the internal face of said joint to the high combustion chamber pressures which penetrate to said internal face.

3. An assembly as claimed in claim 2, wherein an elastic bottom joint is interposed between the internal face of said compression ring and bottom of said corresponding groove and substantially fills the volume available at the bottom of said groove.

4. An assembly as claimed in claim 2, in which the internal diameter of said lateral ring joint is equal to the diameter of said groove bottom with the usual tolerances for clearance, tight fitting and requirements of manufacture.

5. An assembly as claimed in claim 2, wherein said ring groove includes an annular shoulder extending radially from said groove bottom a distance less than the distance between the groove bottom and the inner periphery of said ring, and extending axially from the groove lower face a thickness substantially equal to that of said lateral joint, and the inner diameter of said lateral joint being substantially equal to the diameter of said shoulder.

6. An assembly as claimed in claim 5, in which the lower face of said compression ring is extended at least over a small thickness up to the vicinity of said groove bottom, so as to cover the adjacent faces of said lateral ring joint and of the exterior of said shoulder in the groove face.

7. An assembly as claimed in claim 5, in which said groove bottom is shaped so as to follow the internal contour of said compression ring, with the exception of the clearance necessary for ensuring their normal working without contact between them.

8. An assembly as claimed in claim 5, wherein an elastic bottom joint is interposed between the internal face of said compression ring and bottom of said corresponding groove, and a washer is interposed between the lower face of said bottom joint and the upper faces of said lateral joint and said shoulder.

9. An assembly as claimed in claim 2, wherein the inner diameter of said lateral joint has a diameter substantially greater than the inner periphery of said ring.

10. An assembly as claimed in claim 9, wherein said ring groove includes an annular shoulder extending radially from said groove bottom a distance greater than the distance between the groove bottom and the inner periphery of said ring, said shoulder having an axial thickness substantially equal to said lateral joint and the inner diameter of said lateral joint being substantially equal to the diameter of said shoulder.

11. An assembly as claimed in claim 9, in which said elastic joint of said groove bottom is of a material fairly resistant to creep under the temperature conditions reached in service, so as to prevent it from coming into contact with the internal face of the lateral ring joint, such as "Teflon" mixed when so desired with products which increase its resistance to creep.

12. An assembly as claimed in claim 2, wherein said compression ring includes a relatively wide gap, and an arcuate segment of a relatively elastic material retained in said gap and substantially filling said gap to provide fluid-tightness.

13. An assembly as claimed in claim 12, in which said arcuate segment is made from a material which withstands the effects of pressure, friction, temperature, attacking and diluting action of oil, fuel and combustion residues which act in the vicinity of a compression ring of an internal combustion engine.

14. An assembly as claimed in claim 12, wherein said arcuate segment is a filled polytetra-fluoroethylene material.

15. An assembly as claimed in claim 12, wherein said arcuate segment is clamped into said gap by said ring during assembly of said engine.

16. An assembly as claimed in claim 12, wherein the faces of said compression ring gap and corresponding faces of said arcuate segment are inclined outwardly circumferentially towards the exterior relative to corresponding radii.

17. An assembly as claimed in claim 2, wherein the internal face of said lateral joint is inclined so as to form a truncated cone open towards the top.

18. An assembly as claimed in claim 1, wherein said last means include sealing means in combination with the gap in said compression ring to reduce and control the subjection of the internal face of said joint to the high combustion chamber pressures which penetrate to said internal face.

19. An assembly as claimed in claim 18 in which said compression ring carries at least one small arc of a circular joint embedded in the central portion of its lower face, said embedded joint being arranged on each side of the ring gap.

20. An assembly as claimed in claim 18, in which an annular joint having a radial width similar to that of said ring, is interposed between said ring and said lateral joint.

21. An assembly as claimed in claim 20 in which the joint of the ring gap is of a material suitable for maintaining durable fluid-tightness under conditions of temperature and attack by products in the environment of the compression ring, such as steel, cast-iron, copper alloys, "Teflon," a mixture of "Teflon" with products which improve its characteristics, and the fluorinated elastomer known by the commercial name of "Viton."

22. An assembly as claimed in claim 21 in which the annular joint of the ring gap is cut and it is provided with a joint associated with a cavity formed in said compression ring to prevent them from rotating with respect to each other and to avoid their gaps becoming superimposed.

23. An assembly as claimed in claim 1, including an annular support of a relatively creep resistant material, said support located between the lower face of said lateral joint and the lower face of said groove and extending substantially to the outer periphery of said lateral joint.

24. An assembly as claimed in claim 23, wherein the clearance between the outer peripheral face of said annular support and the cylinder and any discontinuities adjacent said lateral joint are less than the general clearance between piston and cylinder and adapted to prevent creep of said lateral joint under the temperature and pressure operating conditions of the engine.

25. An assembly as claimed in claim 23 wherein said support extends radially inwardly substantially to the inner diameter of said lateral joint.

26. An assembly as claimed in claim 25, in which said support and said joint have an internal diameter in the vicinity of that of said ring and their internal circular faces are at least in proximity to said groove bottom joint.

27. An assembly as claimed in claim 25, wherein said support and said lateral joint have an inner diameter greater than the bottom of said groove and smaller than that of said ring and including an elastic bottom joint between said groove bottom and the inner periphery of said ring, the lower portion of said bottom joint substantially covering the inner periphery of said lateral joint and support.

28. An assembly as claimed in claim 25, in which said support and said joint have an internal diameter greater than that of said ring and are housed in a recess in the lower face of said groove, in such manner that said ring bears simultaneously on a portion of the lower face of said groove and on the upper face of said joint.

29. An assembly as claimed in claim 23 in which said support has one face in contact with said joint which is substantially smaller than that of said joint, its internal diameter being greater than that of the joint, said support being housed in a recess in the lower face of the groove of said piston, in such manner that said joint bears simultaneously on a portion of the lower face of said groove and on the upper face of said support.

30. An assembly as claimed in claim 29, in which said support is composed of a plurality of segments of material having good friction against said cylinder, sufficient in number and adjusted so as to ensure the proximity and discontinuities clearances.

31. An assembly as claimed in claim 30, in which the support is of metal having satisfactory mechanical characteristics, such as heat-treated steels and cast-iron.

32. An assembly as claimed in claim 31, in which said support is furthermore made of a metal which is a good conductor of heat, such as copper, silver and their alloys.

33. An assembly as claimed in claim 23, in which said support is a ring of elastic material having good friction characteristics against said cylinder, and composed of at least one piece.

34. An assembly as claimed in claim 33, in which said support is provided with a plurality of alternate radial slots along only a part of its radial width, and having a diameter in the free state which is slightly greater than that of said cylinder, whereby the external faces of the sections of said ring are applied elastically against said cylinder.

* * * * *